US010815383B2

(12) United States Patent
Kumar et al.

(10) Patent No.: US 10,815,383 B2
(45) Date of Patent: Oct. 27, 2020

(54) PIGMENTED PRIMER COMPOSITION FOR FORMING AN N-ACYL UREA COATING

(71) Applicant: BASF SE, Ludwigshafen (DE)

(72) Inventors: Rajesh Kumar, Riverview, MI (US); Vincent Goldman, Waterford, MI (US); Sunitha Grandhee, Novi, MI (US)

(73) Assignee: BASF SE, Ludwigshafen (DE)

( * ) Notice: Subject to any disclaimer, the term of this patent is extended or adjusted under 35 U.S.C. 154(b) by 188 days.

(21) Appl. No.: 15/748,363

(22) PCT Filed: Jul. 29, 2016

(86) PCT No.: PCT/US2016/044740
§ 371 (c)(1),
(2) Date: Jan. 29, 2018

(87) PCT Pub. No.: WO2017/023765
PCT Pub. Date: Feb. 9, 2017

(65) Prior Publication Data
US 2018/0223111 A1    Aug. 9, 2018

Related U.S. Application Data

(60) Provisional application No. 62/199,444, filed on Jul. 31, 2015.

(51) Int. Cl.
| | |
|---|---|
| *C09D 5/08* | (2006.01) |
| *C09D 175/04* | (2006.01) |
| *C09D 7/61* | (2018.01) |
| *C08G 18/28* | (2006.01) |
| *C09D 7/00* | (2018.01) |
| *C08G 18/34* | (2006.01) |
| *C08G 18/79* | (2006.01) |
| *C08G 18/76* | (2006.01) |
| *C08G 18/65* | (2006.01) |

(52) U.S. Cl.
CPC .......... *C09D 5/084* (2013.01); *C08G 18/282* (2013.01); *C08G 18/348* (2013.01); *C08G 18/6517* (2013.01); *C08G 18/7614* (2013.01); *C08G 18/794* (2013.01); *C08G 18/797* (2013.01); *C09D 5/082* (2013.01); *C09D 7/00* (2013.01); *C09D 7/61* (2018.01); *C09D 175/04* (2013.01)

(58) Field of Classification Search
None
See application file for complete search history.

(56) References Cited

U.S. PATENT DOCUMENTS

| | | | | |
|---|---|---|---|---|
| 3,056,835 A * | 10/1962 | Monagle, Jr. | ........ | C08G 18/025 564/252 |
| 3,152,131 A * | 10/1964 | Heberling, Jr. | ...... | C07D 213/74 546/163 |
| 3,406,197 A * | 10/1968 | Ulrich | .................. | C08G 18/025 564/252 |
| 3,406,198 A * | 10/1968 | Budnick | ................ | C08G 18/02 564/252 |
| 3,522,303 A * | 7/1970 | Ulrich | ...................... | C08K 5/51 564/13 |
| 3,931,059 A * | 1/1976 | La Spina | ............ | C07F 9/65681 521/108 |
| 4,143,063 A * | 3/1979 | Alberino | ................ | B01J 31/069 502/159 |
| 4,266,040 A * | 5/1981 | Lin | ........................... | C08J 9/02 521/128 |
| 5,574,083 A * | 11/1996 | Brown | ................. | C08G 18/025 524/186 |
| 10,435,499 B2 * | 10/2019 | Kumar | ............... | C08G 18/0852 |
| 2009/0171016 A1 * | 7/2009 | Sato | ........................ | C08K 5/29 524/608 |
| 2018/0016377 A1 * | 1/2018 | Kumar | ............... | C08G 18/6611 |
| 2018/0223111 A1 * | 8/2018 | Kumar | ............... | C08G 18/7614 |

FOREIGN PATENT DOCUMENTS

JP    2005-225932 A    8/2005

OTHER PUBLICATIONS

International Search Report & Written Opinion in International Application No. PCT/US2016/044740, dated Feb. 9, 2017.

* cited by examiner

*Primary Examiner* — Joseph D Anthony
(74) *Attorney, Agent, or Firm* — Foley & Lardner LLP

(57) ABSTRACT

This disclosure provides a pigmented primer composition for forming an n-acyl urea coating on a substrate. The pigmented primer composition includes a polycarbodiimide-polyurethane hybrid. The pigmented primer composition also includes an acid functional polymer and an organic solvent, and includes less than or equal to 10 weight percent of water based on a total weight of the pigmented primer composition. The pigmented primer composition also includes a pigment, an inorganic filler, and less than about 100 parts by weight of toluene diisocyanate per one million parts by weight of the pigmented primer composition. The n-acyl urea coating exhibits corrosion resistance of 2 to 10 as determined using ASTM B117 and ASTM D-1654-08 on a substrate that is unpolished cold rolled steel, aluminum, or galvanized steel.

20 Claims, No Drawings

PIGMENTED PRIMER COMPOSITION FOR FORMING AN N-ACYL UREA COATING

CROSS-REFERENCE TO RELATED APPLICATIONS

This application is a U.S. National Phase Application under 35 U.S.C. § 371 of International Application No. PCT/US2016/044740, filed on Jul. 29, 2016, which claims the benefit of U.S. Provisional Patent Application No. 62/199,444, filed on Jul. 31, 2015, the entire disclosures of which are incorporated herein by reference for any and all purposes.

FIELD OF THE DISCLOSURE

This disclosure generally relates to a pigmented primer composition for forming an n-acyl urea coating on a substrate. More specifically, the pigmented primer composition includes a polycarbodiimide-polyurethane hybrid, an acid functional polymer, an organic solvent, a pigment and an inorganic filler. The n-acyl urea coating has excellent anti-corrosion properties.

BACKGROUND

Carbodiimides are widely used condensation reagents in the areas of peptide and organic synthesis to convert carboxylic acids to other more useful groups such as amides and esters. A rapid reaction between carbodiimides and carboxylic acids also enables carbodiimides to serve as acid scavengers and hydrolysis stabilizers for ester based polymers. Carbodiimides have found many uses in industry. However, aromatic carbodiimides, in particular, have not found a suitable application in coatings. Therefore, there remains an opportunity for improvement and advancement.

SUMMARY OF THE DISCLOSURE

This disclosure provides a pigmented primer composition for forming an n-acyl urea coating on a substrate. In one embodiment, the pigmented primer composition includes a polycarbodiimide-polyurethane hybrid having the structure:

wherein each n is independently a number from 1 to 20, wherein Y is an alkoxy or polyalkoxy group having (w) oxygen atoms, wherein each w is independently at least 1, wherein each z is independently a number from 0 to (w-1); and wherein x, Y, and a total of the $C_nH_{2n+1}$ groups are present in a ratio of from (4 to 5):(0.5 to 1.5):(2.5 to 4.5), respectively. The pigmented primer composition also includes an acid functional polymer and an organic solvent, and includes less than or equal to 10 weight percent of water based on a total weight of the pigmented primer composition. The pigmented primer composition also includes a pigment, an inorganic filler, and less than about 100 parts by weight of toluene diisocyanate per one million parts by weight of the pigmented primer composition. The n-acyl urea coating exhibits corrosion resistance of 2 to 10 as determined using ASTM B117 and ASTM D-1654-08 on a substrate that is unpolished cold rolled steel, aluminum, or galvanized steel.

DETAILED DESCRIPTION OF THE DISCLOSURE

This disclosure provides a pigmented primer composition (herein also described as the "composition") for forming an n-acyl urea coating on a substrate. The composition may be described as solvent-borne. The terminology "solvent-borne" typically describes that the composition includes less than or equal to 10, 9, 8, 7, 6, 5 4, 3, 2, 1, 0.5, or 0.1, weight percent of water based on a total weight of the composition. In one embodiment, the composition is entirely free of water. The composition is typically utilized to form the n-acyl urea coating on the substrate. The n-acyl urea coating itself is not particularly limited and is described in greater detail below along with the substrate.

Pigmented Primer Composition:

The composition may be used in a variety of applications including, but not limited to, original equipment manufacturing (OEM) "finish" coatings, aftermarket "refinish" coatings, automotive coatings, protective coatings, films, encapsulants, gels, sealants, release coatings, conformal coatings, and combinations thereof. Most typically, the composition is used as an automotive OEM finish coating or as an automotive refinish coating as a primer. The composition is typically described as a 1K composition.

The composition includes a polycarbodiimide-polyurethane hybrid (hereinafter described as the "hybrid"). In one embodiment, the hybrid has the structure:

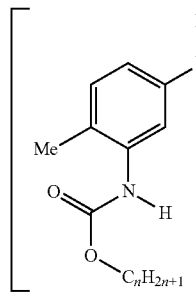 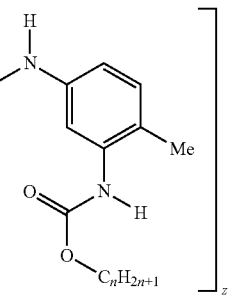

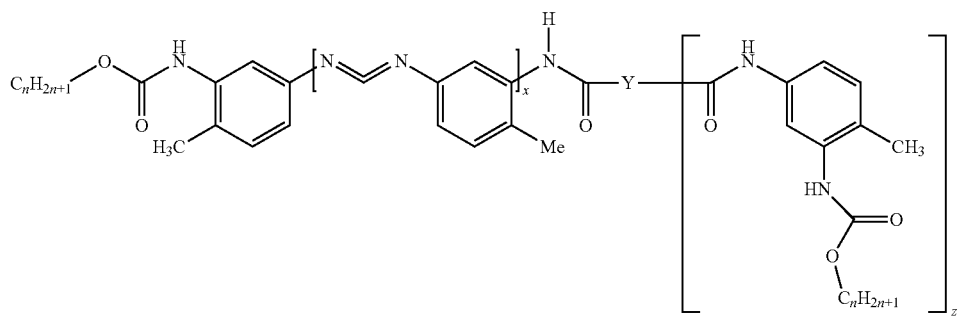

In another embodiment, the hybrid has the structure:

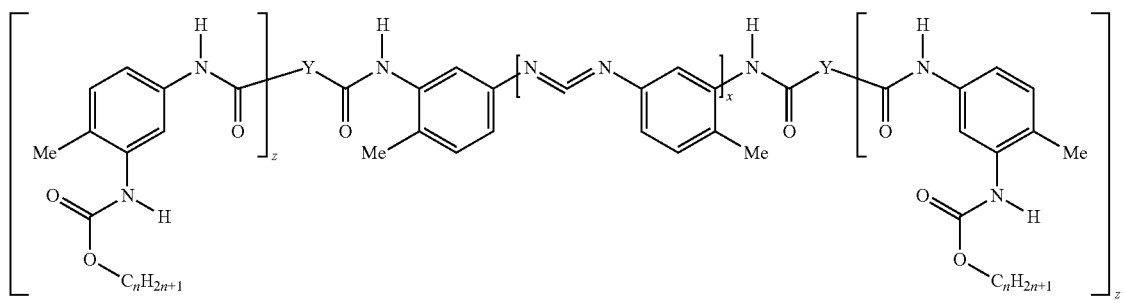

Yet, in another embodiment, the hybrid is further defined as a mixture of both of the immediately aforementioned structures wherein each is independently present in a weight ratio of from 0:100 to 100:0, respectively.

In a further embodiment, a blend of preformed polyurethane/polyurea and polycarbodiimide in 1:100 or 100:1 ratio (or any range of values therebetween) is present, either with or without the aforementioned hybrid. In such embodiments, the preformed polyurethane/polyurea and polycarbodiimide may be any described herein or any formed from any process or method step described herein. For example, the polyurethane/polyurea and/or polycarbodiimide may be formed using any one or more method steps described below. In one embodiment, the polyurethane/polyurea is formed and then segregated, e.g. such that any excess NCO groups do not react to form polycarbodiimides and such that the hybrid is not formed. In such a scenario, the polyurethane/polyurea can then be independently combined with an independently formed polycarbodiimide. Similarly, the polycarbodiimide may be formed and then segregated such that no polyurethane is formed and such that the hybrid is not formed. In such a scenario, the polycarbodiimide can then be independently combined with an independently formed polyurethane/polyurea. In these types of scenarios, the hybrid itself may not be present. Alternatively, the hybrid may be added to the independently formed polyurethane/polyurea and/or to the independently formed polycarbodiimide such that the hybrid would then be present in the mixture after the independently formed polyurethane/polyurea is combined with the independently formed polycarbodiimide.

In these structures, each n is independently a number from 1 to 20, e.g. 1, 2, 3, 4, 5, 6, 7, 8, 9, 10, 11, 12, 13, 14, 15, 16, 17, 18, 19, or 20, or any range thereof. In various embodiments, n is determined based on a monol, diol, triol, or polyol used to form urethane linkages (NCO linkages) in the aforementioned structure.

Also in these structures, each Y is independently an alkoxy or polyalkoxy group having (w) oxygen atoms, wherein each w is independently at least 1. In various embodiments, each w is independently 1, 2, or 3. However, it is contemplated that each w may independently be greater than 3, e.g. 4, 5, 6, 7, or 8. The terminology "alkoxy" typically describes a group having an alkyl moiety singly bonded to an oxygen atom, which in turn is typically bonded to a hydrogen atom, e.g. alkyl-O—H. The terminology "polyalkoxy" group typically describes two or more alkoxy groups bonded together.

In alternative embodiments, each Y is independently derived from a tri-hydroxy functional polyol having a hydroxyl number from 1500 to 2000, from 1550 to 1950, from 1600 to 1900, from 1650 to 1850, from 1700 to 1800, from 1700 to 1750, or from 1750 to 1800, mg KOH/g. In various embodiments, each Y is independently derived from a tri-hydroxy functional polyol having a hydroxyl number from 800 to 1200, 850 to 1150, 900 to 1100, 950 to 1050, 950 to 1000, or 1000 to 1050, mg KOH/g. In other embodiments, each Y is independently derived from a tri-hydroxy functional polyol having a hydroxyl number from 200 to 400, from 250 to 350, from 250 to 300, or from 300 to 350, mg KOH/g. In other embodiments, each Y is independently derived from a tri-hydroxy functional polyol having a hydroxyl number from 20 to 400, from 30 to 390, from 40 to 380, from 50 to 370, from 60 to 360, from 70 to 350, 80 to 340, from 90 to 330, from 100 to 320, from 110 to 310, from 120 to 300, from 130 to 290, from 140 to 280, from 150 to 270, from 160 to 260, from 170 to 250, from 180 to 240, from 190 to 230, from 200 to 220, from 200 to 210, or from 210 to 220, mg KOH/g. In other embodiments, each Y is independently derived from glycerine. In further embodiments, each Y is independently derived from propylene glycol, ethylene glycol, butylene glycol, copolymers thereof, and combinations thereof. Alternatively, each Y may be independently derived from a diol. Further, each Y may be independently derived from a monol, e.g. 1-decanol, 2-propyl-1-heptanol, or 2-ethyl-hexanol, or a combination thereof. Alternatively, each Y may be described as being independently derived from a polyester polymer. The monols, diols, and polyols used may be chosen from those set forth in the instant Examples below, e.g. glycerine, Pluracol 858, Pluracol GP 430, and Pluracol GP 730, and combinations thereof. In further embodiments, each Y may be described as being independently derived from a polyol that is 4, 5, 6, 7, or 8, hydroxy-functional or a combination thereof. In still other embodiments, each Y may independently be any described above. For example, if the hybrid has two Y groups, then they may be the same or different from each other. In one embodiment, Y is or is derived from trimethylolpropane.

Moreover in these structures, z is a number from 0 to (w−1), e.g., 0, 1 or 2. Additionally, x, Y, and a total of the $C_nFl_{211+1}$ groups are present in a ratio of from (4 to 5):(0.5 to 1.5):(2.5 to 4.5), respectively. In various embodiments, the first value of from (4 to 5) may be further defined as from 4.1 to 4.9, from 4.2 to 4.8, from 4.3 to 4.7, from 4.4 to 4.6, from 4.4 to 4.5, or from 4.5 to 4.6, or any other range thereof. In other embodiments, the second value of from (0.5 to 1.5) may be further defined as 0.6 to 1.4, 0.7 to 1.3, 0.8 to 1.2, 0.9 to 1.1, 0.9 to 1, or 1 to 1.1, or any other range thereof. In further embodiments, the third value of from (2.5 to 4.5) may be further defined as 2.6 to 4.4, 2.7 to 4.3, 2.8 to 4.2, 2.9 to 4.1, 3 to 4, 3.1 to 3.9, 3.2 to 3.8, 3.3 to 3.7, 3.4 to 3.6, 3.4 to 3.5, or 3.5 to 3.6.

In one embodiment, w is 3 and z is 2. For example, the hybrid may have the structure:

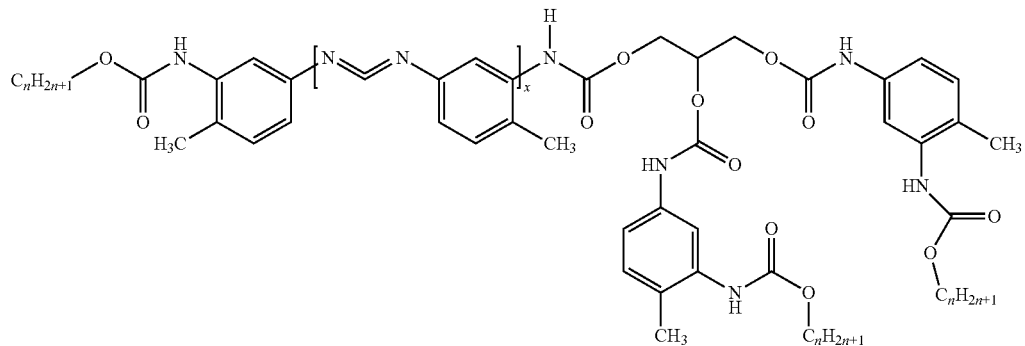

Alternatively, the hybrid may have the structure:

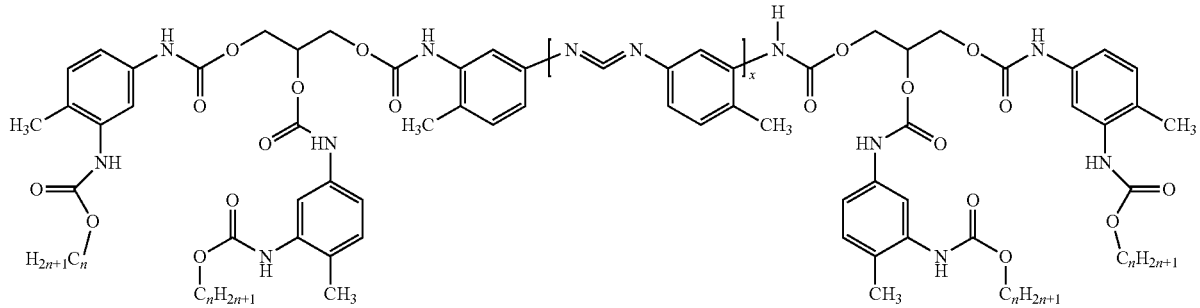

However, it is contemplated that even when w is 3 and z is 2, the hybrid may have a different structure than what is set forth above, e.g. depending on Y.

In other embodiments, w is 2 and z is 1. For example, the hybrid may have the structure:

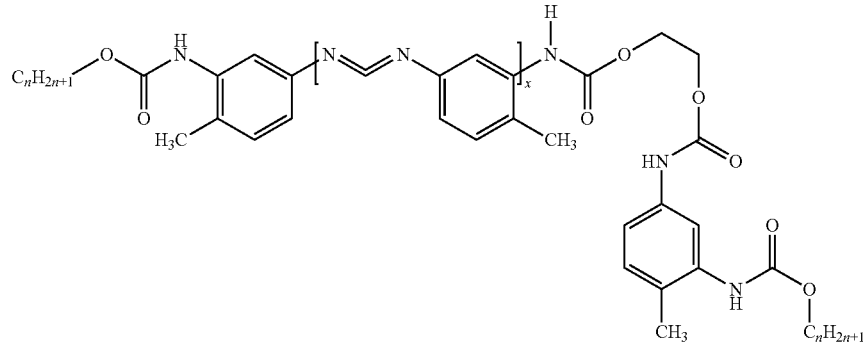

Alternatively, the hybrid may have the structure:

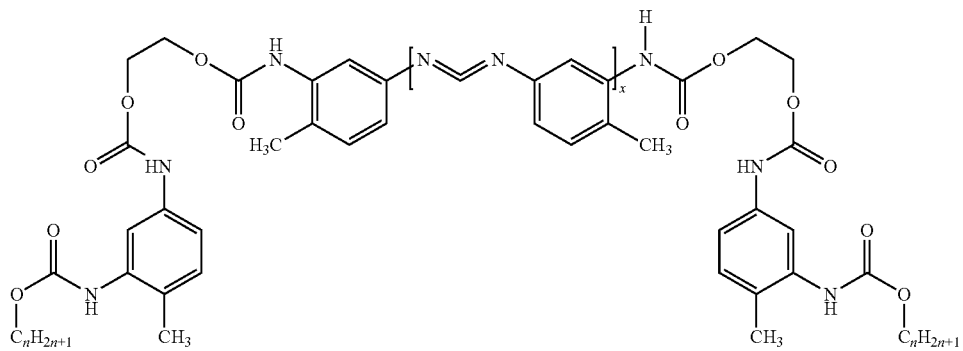

However, it is contemplated that even when w is 2 and z is 1, the hybrid may have a different structure than what is set forth above, e.g. depending on Y.

In further embodiments, w is 1 and z is 0. For example, the hybrid may have the structure:

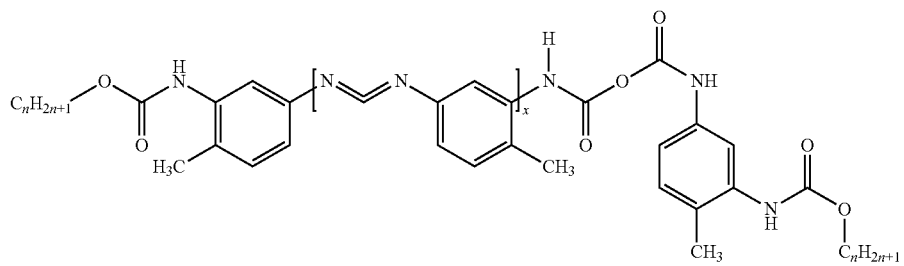

Alternatively, the hybrid may have the structure:

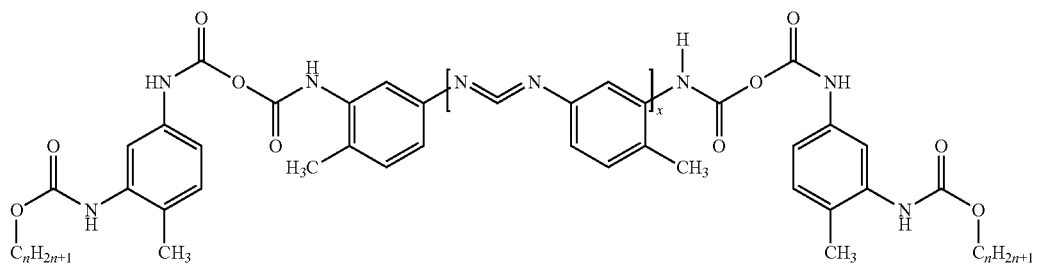

However, it is contemplated that even when w is 1 and z is 0, the hybrid may have a different structure than what is set forth above, e.g. depending on Y.

In still other embodiments, the hybrid may be defined as the reaction product of a polycarbodiimide and a monol, diol, triol, or polyol. For example, an isocyanate, e.g. toluene diisocyanate or any isomers thereof, may be used to form the hybrid. It may be reacted (with itself) in the presence an appropriate catalyst known in the art, using heating (e.g. at 110° C.) until an NCO content drops, e.g. to 8 to 15%, 10 to 12%, etc. At this stage, solvent can be added. This typically forms a polycarbodiimide. At that point, the monol, diol, triol, or polyol, or a combination of any one or more, can be added in any order and reacted with the polycarbodiimide to form the hybrid. Alternatively, an isocyanate (such as TDI or any isomers thereof) and a polyol can be reacted to form a polyurethane that has an excess of NCO groups. At that point, a catalyst, such as the one described above or any known to be suitable in the art, may be added such that the NCO groups react together thereby forming a polycarbodiimide linkage and forming the hybrid. At any one of these points, the process may be stopped such that a polyurethane/polyurea and/or polycarbodiimide may be segregated, e.g. as described in various embodiments above. In such embodiments, the independently formed polyurethane/polyurea and polycarbodiimide can be later combined.

The carbodiimidization catalyst may be any type of carbodiimidization catalyst known to those skilled in the art for producing a polycarbodiimide. Generally, the carbodiimidization catalyst is selected from the group of tertiary amides, basic metal compounds, carboxylic acid metal salts and/or non-basic organo-metallic compounds. In certain embodiments, the carbodiimidization catalyst includes a phosphorus compound.

Specific examples of phosphorus compounds suitable for the purposes of the carbodiimidization catalyst include, but are not limited to, phospholene oxides such as 3-methyl-1-phenyl-2-phospholene oxide, 1-phenyl-2-phospholen-1-oxide, 3-methyl 1-2-phospholen-1-oxide, 1-ethy 1-2-phos phol en-1-oxide, 3-methyl-1-phenyl-2-phospholen-1oxide, and 3-phospholene isomers thereof. A particularly suitable phospholene oxide is 3-methyl-1-phenyl-2-phospholene oxide.

Additional examples of phosphorous compounds suitable for the purposes of the carbodiimidization catalyst include, but are not limited to, phosphates, diaza- and oxaza phospholenes and phosphorinanes. Specific examples of such phosphorous compounds include, but are not limited to, phosphate esters and other phosphates such as trimethyl phosphate, triethyl phosphate, tributyl phosphate, tri-2-ethylhexyl phosphate, tributoxyethyl phosphate, trioleyl phosphate, triphenyl phosphate, tricresyl phosphate, trixylenyl phosphate, cresyl diphenyl phosphate, xylenyl diphenyl phosphate, 2-ethylhexyldiphenyl phosphate, and the like; acidic phosphates such as methyl acid phosphate, ethyl acid phosphate, isopropyl acid phosphate, butyl acid phosphate, 2-ethylhexyl acid phosphate, isodecyl acid phosphate, lauryl acid phosphate, isotridecylacid phosphate, myristyl acid phosphate, isostearyl acid phosphate, oleyl acid phosphate, and the like; tertiary phosphites such as triphenyl phosphite, tri(p-cresyl) phosphite, tris(nonylphenyl) phosphite, triisooctyl phosphite, diphenyisodecyl phosphite, phenyldiisodecyl phosphite, triisodecyl phosphite, tristearyl phosphite, trioleyl phosphite, and the like; secondary phosphites such as di-2-ethylhexyl hydrogen phosphite, dilauryl hydrogen phosphite, dioleyl hydrogen phosphite, and the like; and phosphine oxides, such as triethylphosphine oxide, tributylphosphine oxide, triphenylphosphine oxide, tris(chloromethyl)phosphine oxide, tris(chloromethyl)phosphine oxide, and the like. Carbodiimidization catalysts including phosphate esters and methods for their preparation are described in U.S. Pat. No. 3,056,835, which is hereby incorporated by reference in its entirety, in various non-limiting embodiments.

Yet further examples the carbodiimidization catalyst include, but are not limited to, 1-phenyl-3-methyl phospholene oxide, 1-benzyl-3-methyl phospholene oxide, 1-ethyl-3-methyl phospholene oxide, 1-phenyl-3-methyl phospholene dichloride, 1-benzyl-3-methyl phospholene dichloride, 1-ethyl-3-methyl phospholene dichloride, 1-phenyl-3-methyl phospholene sulphide, 1-phenyl-3-methyl phospholene sulphide, 1-benzyl-3-methyl phospholene sulphide, 1-ethyl-3-methyl phospholene sulphide, 1-phenyl-1-phenylimino-3-methyl phospholene oxide, 1-benzyl-1-phenylimino-3-methyl phospholene oxide 1-ethyl-1-phenylimino-3-methyl phospholene oxide, 1-phenyl phospholidine, 1-benzyl phospholidine, 1-ethyl phospholidine, and 1-phenyl-3-methyl phospholene oxide.

The carbodiimidization catalyst may alternatively include diaza- and oxazaphospholenes and phosphorinanes. Diaza- and oxaza-phospholenes and phosphorinanes and methods for their preparation are described in U.S. Pat. No. 3,522,303, which is hereby incorporated by reference in its entirety. Specific diaza- and oxaza-phospholenes and phosphorinanes include, but are not limited to, 2-ethyl-1,3-dimethyl-1,3-2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2-oxide; 2-p-henyl-1,3-dimethyl-1,3,2-diazaphospholane-2-oxide; 2-phenyl-1,3-dimethyl-1,3,2-diazaphosphorinane-2-oxide; 2-benzyl-1,3-di methyl-1,3,2-diazaphospholane-2-oxide; 2-allyl-1,3-dimethyl-1,3,2-diazaphospholane-2-oxide; 2-bromomethyl-1,3-dimethyl-1,3,2-diazaphospholane-2-oxide; 2-cyclohexyl-1,3-dimethyl-1,3,2-diazaphospholane-2-oxide; 2-cyclohexyl-1,3-dimethyl-1,3,2-diaphospholane-2-oxide; 2-(2-ethoxy ethyl1,3-dimethyl-1,3,2-diazaphospholane-2-oxide; and 2-naphthyl-1,3-dimethyl-1,3,2-diazaphospholane-2-oxide, triethyl phosphate, hexamethyl phosphoramide, and the like.

The carbodiimidization catalyst may include a triaryl arsine. Triaryl arsines and methods for their preparation are described in U.S. Pat. No. 3,406,198, which is hereby incorporated by reference in its entirety in various non-limiting embodiments. Specific examples of triaryl arsines include, but are not limited to, triphenylarsine, tris(p-tolyl) arsine, tris(p-methoxyphenyl) arsine, tris(p-ethoxyphenyl) arsine, tris(p-chlorophenyl)arsine, tris(p-fluorophenyl) arsine, tris(2,5-xylyl)arsine, tris(p-cyanophenyl)arsine, tris (naphthyl)arsine, tris(p-methylmercaptophenyl)arsine, tris (p-biphenylyl)arsine, p-chlorophenyl bis(p-tolyl)arsine, phenyl(p-chlorophenyl)(p-bromophenyl)arsine, and the like. Additional arsine compounds are described in U.S. Pat. No. 4,143,063, which is hereby incorporated by reference in its entirety, in various non-limiting embodiments. Specific examples of such arsine compounds include, but are not limited to, triphenylarsine oxide, triethylarsine oxide, polymer bound arsine oxide, and the like. Further, the carbodiimidization catalyst may include metallic derivatives of acetylacetone. Metallic derivatives of acetylacetone and methods are described in U.S. Pat. No. 3,152,131, which is hereby incorporated by reference in its entirety in various non-limiting embodiments. Specific examples of metallic derivatives of acetylacetone include, but are not limited to, metallic derivatives of acetylacetone such as the beryllium, aluminum, zirconium, chromium, and iron derivatives. Additional examples of the carbodiimidization catalyst include metal complexes derived from a d-group transition element and i-bonding ligand selected from the group consisting of carbon monoxide, nitric oxide, hydrocarbylisocyanides, trihydrocarbylphosphine, trihydrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such metal complexes and methods for preparation are described in U.S. Pat. No. 3,406,197, which is hereby incorporated by reference in its entirety in various non-limiting embodiments. Specific examples of metal complexes include, but are not limited to, iron pentacarbonyl, di-iron pentacarbonyl, tungsten hexacarbonyl, molybdenum hexacarbonyl, chromium hexacarbonyl, dimanganese decacarbonyl, nickel tetracarbonyl, ruthenium pentacarbonyl, the complex of iron tetracarbonyl:methylisocyanide, and the like.

The carbodiimidization catalyst may include organotin compounds. Specific examples of organotin compounds include, but are not limited to, dibutyltin dilaurate, dibutyltin diacetate, dibutyltin di(2-ethylhexanoate), dioctyltin dilaurate, dibutyltin maleate, di(n-octyl)tin maleate, bis(dibutylacetoxytin) oxide, bis(dibutyllauroyloxytin) oxide, dibutyltin dibutoxide, dibutyltin dimethoxide, dibutyltin disalicilate, dibutyltin bis(isooctylmaleate), dibutyltin bis (isopropylmaleate), dibutyltin oxide, tributyltin acetate, tributyltin isopropyl succinate, tributyltin linoleate, tributyltin nicotinate, dimethyltin dilaurate, dimethyltin oxide, diotyltin oxide, bis(tributyltin) oxide, diphenyltin oxide, triphenyltin acetate, tri-n-propyltin acetate, tri-n-propyltin laurate and bis(tri-n-propyltin) oxide, dibutyltin dilauryl mercaptide, dibutyltin bis(isooctylmercaptoacetate),bis(triphenyltin)oxide, stannous oxalate, stannous oleate, stannous naphthenate, stannous acetate, stannous butyrate, stannous 2-ethylhexanoate, stannous laurate, stannous palmitate, stannous stearate, and the like. Typical organotin compounds include, but are not limited to, stannous oxalate, stannous oleate and stannous 2-ethylhexanoate, dibutyltin diacetate, dibutyltin dilaurate, dibutyltin dilaurylmercaptide, dibutyltin bis(isooctylmercaptoacetate), dibutyltin oxide, bis (triphenyltin) oxide, and bis(tri-n-butyltin) oxide. Further, the carbodiimidization catalyst may include various organic and metal carbene complexes, titanium(IV) complexes, copper(I) and/or copper(II) complexes.

The hybrid is typically present in an amount of from 5 to 80, 10 to 75, 15 to 70, 20 to 65, 25 to 60, 30 to 55, 35 to 50, 40 to 45, or 45 to 50, parts by weight per 100 parts by weight of the composition. In additional non-limiting embodiments, all values and ranges of values between the aforementioned values are hereby expressly contemplated.

Acid Functional Polymer:

The composition also includes an acid functional polymer. Typically, the acid functional polymer reacts with the hybrid to form the n-acyl urea coating. The acid functional polymer is also not particularly limited and may be any polymer that includes one or more acidic groups, such as —H groups, carboxylic acid groups, carbonic acid groups, sulfonic, thiol, phenols, phosphoric, and sulfinic acid groups, and the like. In various embodiments, the acid functional polymer is chosen from organic mono, di, and/or poly-acids, polyacrylic acids, acid functional polyurethanes, acid functional polyesters, thiols, phenols, phosphoric functional and combinations thereof. The acid functional polymer is not particularly limited in an amount in the composition. However, the acid functional polymer is typically present in an amount of from 5 to 80, 10 to 75, 15 to 70, 20 to 65, 25 to 60, 30 to 55, 35 to 50, 40 to 45, or 45 to 50, parts by weight per 100 parts by weight of the composition. In additional non-limiting embodiments, all values and ranges of values between the aforementioned values are hereby expressly contemplated.

Organic Mono, Di-, and/or Poly-Acid:

In one embodiment, the acid functional polymer is further defined as an organic mono, di, and/or poly-acid. The organic mono, di, and/or poly-acid is not particularly limited and may be any known in the art. For example, the organic mono, di, and/or poly-acid may have the formula $HO(O)CR[C(O)OH]_m$ wherein R is an alkyl group having from 1 to 36, e.g. from 1 to 20, carbon atoms and m is from 0 to 3. In various non-limiting embodiments, it is contemplated that for each of the aforementioned ranges, each value may independently be any value or range of values therebetween. In one embodiment, the organic mono, di, and/or poly-acid is a polymer of a dimer acid. The organic mono, di, and/or poly-acid is not particularly limited in an amount in the composition. In various embodiments, the following commercial products may be utilized as the organic mono, di, and/or poly-acid: Empol® 1003, –1016, –1026, –1028, –1061, –1062, –1043, –1008, –1012, and/or Pripol® 1006, 1009, 1012, 1013, 1017, 1022, 1025, 1027, or combinations thereof. Additional commercially available suitable products include dimers acids such as LS-17, and HY-001, –002, –003, –004, and –005, and combinations thereof, that are commercially available from Anqing Hongyu Chemical Co., Ltd. or Jiujiang Lishan Entech Co., Ltd.

Polyacrylic Acid:

In another embodiment, the acid functional polymer is further defined as a polyacrylic acid. The polyacrylic acid is not particularly limited and may be any known in the art. In various embodiments, the polyacrylic acid is further defined as a modified acrylic copolymer or styrene acrylic resin. Alternatively, the polyacrylic acid may be described as an acid functional copolymer of styrene and/or alpha-methylstyrene and an acrylate or methacrylate and/or 2-ethylhexylacrylate. In various embodiments, the following commercial products may be utilized as the polyacrylic acid: Joncryl® 611, 682, or combinations thereof.

Acid Functional Polyurethane:

In still other embodiments, the acid functional polymer is further defined as an acid functional polyurethane. The acid functional polyurethane is not particularly limited and may be any polyurethane that includes an acidic group. The acid functional polyurethane may have the formula $OCNR'NHCOOCH_2C(CH_3)(COOH)CH_2OCONHR'NCO$, wherein each R' is independently a TDI, MDI, HDI, IPDI, NDI, or TMXDI residue. Alternatively, the acid functional polyurethane may be a prepolymer of TDI, MDI, HDI, IPDI, NDI, or TMXDI. Any of these isocyanate residues or prepolymers may be formed using the isocyanates or isomers thereof or blends thereof. The aforementioned acronyms are understood by those of skill in the art.

Acid Functional Polyester:

In further embodiments, the acid functional polymer is further defined as an acid functional polyester. In various embodiments, the acid functional polyester is chosen from (1) a polymer of styrene, maleic anhydride, and an alcohol, (2) a polymer of caprolactone and dimethylolpropionic acid, and combinations thereof. In other embodiments, the acid functional polyester is further defined as linear. In another embodiment, the acid functional polyester may be further defined as a styrene-maleic anhydride ester or styrene maleic anhydride copolymer. In various embodiments, the following commercial products may be utilized as the acid functional polyester: SMA 1440, –2625, –3840, –17352, DICAP 2020, DMPA® Polyol HA-0135, DMPA® Polyol HA-0135LV2, or combinations thereof.

Organic Solvent:

The composition also includes an organic solvent. The organic solvent is not particularly limited and may be any of the art. For example the organic solvent may be polar or non-polar. In various embodiments, the organic solvent is chosen from dimethoxyether, tetrahydrofuran, butylacetate, xylene, methyl ethyl ketone, methyoxypropylacetate, acetone, and combinations thereof. In other embodiments, the organic solvent is chosen from alcohols, dimethoxyether, tetrahydrofuran, butylacetate, aliphatic- and aromatic hydrocarbons, methyl ethyl ketone, methyoxypropylacetate, 1-chloro-4 (trifluoromethyl)benzene, acetone, and combinations thereof. In other embodiments, the organic solvent is chosen from alcohols, ethers, ketones, acetates, and combinations thereof. In further embodiments, the organic solvent is chosen from alcohols, glycols, halogenated and/or non-halogenated aliphatic- and aromatic hydrocarbons, esters, ketones, ethers and combinations thereof.

As first described above, the composition is solvent-borne and includes less than or equal to 10, 9, 8, 7, 6, 5, 4, 3, 2, or 1, weight percent of water based on a total weight of the pigmented primer composition. In other words, typically the organic solvent is used almost exclusively in place of water. However, some residual water may be present, e.g. up to about 10 weight percent. The organic solvent itself is typically present in the composition an amount of from 1 to 99, 5 to 95, 10 to 95, 10 to 50, 15 to 90, 20 to 85, 25 to 80, 30 to 75, 35 to 70, 40 to 65, 45 to 60, 50 to 55, or 55 to 60, parts by weight per 100 parts by weight of the composition. In other words, the composition typically has a solids content of (100 minus the weight percent of the organic solvent). In additional non-limiting embodiments, all values and ranges of values between the aforementioned values are hereby expressly contemplated.

Pigment:

The composition also includes a pigment. The pigment is not particularly limited and may be any known in the art. For example, the pigment may be titanium dioxide ($TiO_2$), iron oxide, bismuth vanidate, isoindoline, benzimidazolone, perinone, naphtol, quinacridone, DPP, perylene, copper phthalocyanine, or combinations thereof. In various embodiments, the pigment is chosen from one or more of the following product lines, each of which is commercially available from BASF Corporation, Firemist®, Glacier™, Lumina®, Lumina® Royal, Mearlin®, Metasheen®, Paliocrom®, Paliocrom® Brilliant, Cinquasia®, Cromophtal®, Irgazin®, Heliogen®, Paliogen®, Paliotan®, Paliotol®, Sicopal®, Sicotan®, Sicotrans®, or combinations thereof. The pigment may be present in the composition in any amount chosen by one of skill in the art. In various embodiments, the pigment is present in an amount of from 1 to 20, from 5 to 20, from 5 to 10, from 10 to 20, from 10 to 15, or from 15 to 20, parts by weight per 100 parts by weight of the composition.

Inorganic Filler:

The composition also includes an inorganic filler. The inorganic filler is typically chosen from calcium carbonate, barium sulfate, magnesium silicate, bentonite, wollastonite, talc, and combinations thereof. The inorganic filler may be present in the composition in any amount chosen by one of skill in the art. In still other embodiments the inorganic filler is a combination of barium sulfate, calcium carbonate, talc, and bentonite clay.

In various embodiments, the inorganic filler is present in an amount of from 1 to 60, from 1 to 50, from 5 to 60, from 5 to 55, from 10 to 50, from 15 to 45, from 20 to 40, from 25 to 35, or from 30 to 35, parts by weight per 100 parts by weight of the composition.

The inorganic filler may be chosen to level out substrate irregularities. The inorganic filler may be white or grey in color and may have a low refractive index such that the inorganic filler may not have pigment character. The inorganic filler may be chosen to give the composition and coating filling power. The inorganic filler may form a solid structure in the wet composition/coating. The inorganic filler may be chosen to partially substitute for the pigment and/or to influence properties such as gloss, grindability, adhesion, and elasticity.

Properties of the Composition:

The composition is not limited to any particular physical or chemical properties. In various embodiments, the composition may have one or more of the properties described below or may have different properties altogether.

In various embodiments, the composition has a pot life of at least or up to 2, 3, 4, 6, 8, 10, 12, 14, 16, 18, 20, 22, or 24 hours. In other embodiments, the composition has a pot life of 4 to 6, 4 to 8, 6 to 8, 4 to 10, 4 to 12, 6 to 10, 6 to 12, 2 to 4, or 6 to 8, hours, or any number or range of hours between the aforementioned number of hours and up to 24 hours. Increased pot-life tends to allow for better control over, and customization of, properties of the composition and the eventual film/coating. Moreover, increased pot-life tends to increase production efficiencies, increase flexibility, and reduce manufacturing times. Pot-Life is typically determined using BYK-Gardner DIN 4 mm viscosity cups conform to the flow characteristics specified by Deutsche Normen DIN 53211. ASTM D1200 can also be used.

In other embodiments, the composition has a viscosity of from 40 cps to 4,000 mPa·s, from 10 cps to 4,000 mPa·s, from 500 cps to 4,000 mPa·s, or from 1000 cps to 4000 mPa·s as determined using ASTM D5146-10. Viscosity can contribute to ease of application of the composition onto a substrate and can increase control and optimization of performance of the composition and the film/coating. In additional non-limiting embodiments, all values and ranges of values between the aforementioned values are hereby expressly contemplated.

Method of Forming the Composition:

This disclosure also provides a method of forming the pigmented primer composition. The method includes the steps of providing the polycarbodiimide-polyurethane hybrid, providing the acid functional polymer, providing the organic solvent, providing the pigment, and providing the inorganic filler. Each step of providing may independently be described as supplying or otherwise making each of these components available for formation of the composition. Each component may be provided independently or with one or more other components. In one embodiment, the method does not form the hybrid itself but instead includes the step of independently forming a polyurethane/polyurea and/or independently forming a polycarbodiimide.

The method also includes the step of combining the hybrid, the acid functional polymer, the organic solvent, the pigment, and the inorganic filler, to form the pigmented primer composition. Typically, the acid functional polymer and any other additives are added to a reactor followed by addition of the organic solvent. This mixture is solubilized via mechanical mixing. Subsequently, the hybrid is added to the mixture which is further mechanically mixed. The order may be reversed, i.e., the hybrid may be added to the reactor followed by the organic solvent. The mixture may then be homogenized by mixing. In such an embodiment, the acid functional polymer is then added and additional mixing is utilized to form a homogeneous solution. In alternative embodiments, the method does not include the step of combining the hybrid. Instead, in such embodiments, the method includes the step of combining the independently formed polyurethane/polyurea and the independently formed polycarbodiimide, the acid functional polymer, and the organic solvent to form the solvent-based composition. The pigment and the inorganic filler can each be independently added at any point in the method.

The pigmented primer composition also includes less than about 100 parts by weight of (residual) toluene diisocyanate per one million parts by weight of the pigmented primer composition. In various embodiments, the composition includes less than 95, 90, 85, 80, 75, 70, 65, 60, 55, 50, 45, 40, 35, 30, 25, 20, 15, 10, or 5, parts by weight of (residual) toluene diisocyanate per one million parts by weight of the pigmented primer composition. Similarly, the coating itself and/or the hybrid itself, or the composition described below, may independently include less than 95, 90, 85, 80, 75, 70, 65, 60, 55, 50, 45, 40, 35, 30, 25, 20, 15, 10, or 5, parts by weight of (residual) toluene diisocyanate per one million parts by weight of the coating or hybrid or composition, respectively. In further embodiments, the composition, coating, hybrid, and/or composition may include even less of the residual toluene diisocyanate, e.g. less than 95, 90, 85, 80, 75, 70, 65, 60, 55, 50, 45, 40, 35, 30, 25, 20, 15, 10, 5, 4, 3, 2, 1, 0.5, 0.1, 0.05, or 0.01, parts by weight of (residual) toluene diisocyanate per one million parts by weight of the composition, coating, hybrid, or composition, respectively, depending on, e.g. dilution with the solvent and/or evaporation of the toluene diisocyanate. The terminology "residual" typically describes an amount of toluene diisocyanate left over/remaining from the original synthesis used to form the hybrid.

Hybrid Composition:

This disclosure also provides a hybrid composition that includes the hybrid and the organic solvent. The hybrid composition typically results from the formation of the hybrid itself, e.g. by any of the methods or reactions described above. The hybrid composition may be combined with the acid functional polymer to form the composition. In alternative embodiments, the hybrid composition does not include the hybrid itself and instead includes the aforementioned independently formed polyurethane/polyurea and/or the independently formed polycarbodiimide.

N-Acyl Urea Film/Coating:

This disclosure also provides the n-acyl urea film/coating itself. In the absence of the substrate, the coating can be described independently as a film. Accordingly, in various embodiments, the terminology "film" and "coating" may be interchangeable as set forth below.

The film is an n-acyl urea film, as is understood in the art. The film/coating includes or is the reaction product of the hybrid and the acid functional polymer. The hybrid and the acid functional polymer react in the presence of the organic solvent, the pigment, and the inorganic filler. Reaction speed may be controlled by catalyzing the reaction by using Lewis bases and/or by manipulating thermal energy of the composition. The reaction may proceed as shown below or in a variant thereof as would be understood by one of skill in the art.

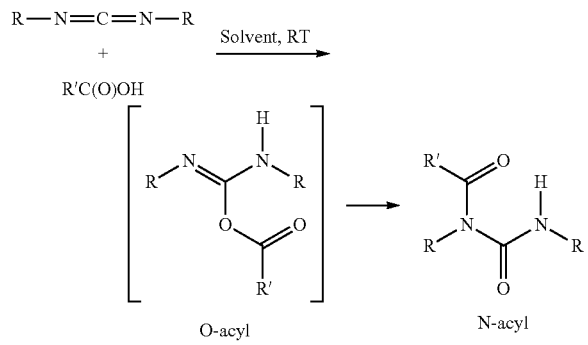

It is also contemplated that the film may be alternatively described as including n-acyl urea compounds/moieties but also including other compounds/moieties, e.g. those that may be formed if a stoichiometric excess of the hybrid is utilized, if a stoichiometric excess of the acid functional polymer is utilized, if a stoichiometric excess of the independently formed polyurethane/polyurea is utilized, or if a stoichiometric excess of the independently formed polycarbodiimide is utilized.

The film/coating is not particularly limited to any size, shape, or thickness and may be formed to specifications as determined by one of skill in the art. In various embodiments, the film/coating has a thickness of from 25 to 200, from 50 to 175, from 75 to 150, from 100 to 125, or from 125 to 150, microns, or any value or range of values therebetween. In other embodiments, the film/coating has a gloss of 90 to 100 measured at a 60 degree angle. Gloss (+/−2) % can be measured from an angle of 60 degrees using a BYK Gardner Multigloss meter in accordance with either ASTM D2457 or ASTM D523. In further embodiments, the film/coating has a pendulum hardness of from 70-95 as determined using a 100p,m wet film on glass, at 23±2° C., and at 56±5% relative humidity, using ASTM D4366. In still other embodiments, the film/coating has a pencil hardness of F-H using a 100 μm wet film on glass, at 23±2° C., and at 56±5% relative humidity, using ASTM D-3363-05. Moreover, the film/coating may have a chemical resistance of MEK double rubs above 100 or 200, as determined using ASTM D5402 or A7835. In various non-limiting embodiments, all values and ranges of values between the aforementioned values are hereby expressly contemplated.

The coating typically exhibits corrosion resistance of 2 to 10, 3 to 9, 4 to 8, 5 to 7, 5 to 6, or, 2, 3, 4, 5, 6, 7, 8, 9, or 10, as determined using ASTM B117 and ASTM D-1654-08 on a substrate that is unpolished cold rolled steel, aluminum, or galvanized steel. In various embodiments, the coating exhibits adhesion of 3 to 5, 3 to 4, 4 to 5, 3, 4, or 5, as determined using ASTM D3359 Method B on a substrate that is unpolished cold rolled steel, aluminum, or galvanized steel. In other embodiments, the coating exhibits humidity resistance of 5 to 10, 6 to 9, 7 to 8, 5, 6, 7, 8, 9, or 10, as determined using ASTM D2247 on a substrate that is unpolished cold rolled steel, aluminum, or galvanized steel. In still other embodiments, the coating exhibits blistering resistance of 5 to 10, 6 to 9, 7 to 8, 5, 6, 7, 8, 9, or 10, as determined using water immersion and ASTM D-714-02 on a substrate that is unpolished cold rolled steel, aluminum, or galvanized steel. In still other embodiments, the coating exhibits a dE color change (also known as delta e) of less than 2.0, 1.9, 1.8, 1.7, 1.6, 1.5, 1.4, 1.3, 1.2, 1.1, 1.05, 1.0, 0.9, 0.8, 0.7, etc., as determined using the Cie76 algorithm. More specifically, the calculation is as follows: $\Delta E^*_{ab} = \sqrt{((L^*_2 L^*_1)^2 + (a^*_2 - a^*_1)^2 + (b^*_2 - b^*_1)^2)}$.

In various embodiments, the progress of the reaction can be monitored by the decreased intensity of —N═C═N— vibration at 2100 cm$^{-1}$ with time. If the pigmented primer composition utilizes n-butyl acetate solvent, the formation of n-acyl urea vibration can be difficult to monitor as it absorbs very close to the ester band of the solvent. However, upon utilizing solvents not absorbing in the region or in neat composition (i.e. without a solvent), a strong vibration 1700 cm$^{-1}$ assignable to n-acyl urea may be observed.

Method of Forming the N-Acyl Urea Film/Coating:

This disclosure also provides a method of forming the n-acyl urea film/coating. The method includes the steps of providing the polycarbodiimide-polyurethane hybrid, providing the acid functional polymer, providing the organic solvent, providing the pigment, providing the inorganic filler, combining (in any order) the polycarbodiimide-polyurethane hybrid, the acid functional polymer, the organic solvent, the pigment, and the inorganic filler, to form the pigmented primer composition, and reacting the polycarbodiimide-polyurethane hybrid and the acid functional polymer in the presence of the organic solvent, the inorganic filler, and the pigment, to form the n-acyl urea film. Each step of providing may independently be described as supplying or otherwise making each of these components available for formation of the composition. Each component may be provided independently or with one or more other components. In other embodiments, the method does not include the step of providing the hybrid and instead includes the step of providing the independently formed polyurethane/polyurea and providing the independently formed polycarbodiimide.

Article:

This disclosure also provides an article including a substrate and the n-acyl urea film/coating disposed on the substrate, e.g. by spraying, pouring, brushing, coating, etc. The n-acyl urea film/coating may be disposed on and in direct contact with the substrate or on and spaced apart from the substrate. For example, the n-acyl urea film/coating may be disposed on the substrate such that there is no layer in between the n-acyl urea film/coating and the substrate. Alternatively, the n-acyl urea film/coating may be disposed "on" the substrate and yet there may be an intermediate layer disposed between the n-acyl urea film/coating and the substrate. In this non-limiting embodiment, the n-acyl urea film/coating may still be described as being "disposed on" the substrate. The substrate is not particularly limited and may be any known in the art such as wood, metal, plastic, glass, a polymer, etc. In various embodiments, the article is further defined as furniture, wood flooring, wood trim, joinery (e.g. the wooden components of a building, such as stairs, doors, and door and window frames, viewed collectively), etc.

Automobile Component:

This disclosure also provide an automobile component including the substrate and the n-acyl urea coating that resists corrosion disposed on the substrate. In various embodiments, the coating includes or is the reaction product of the polycarbodiimide-polyurethane hybrid and the acid functional polymer which are reacted in the presence of the organic solvent, the pigment, and the inorganic filler.

The substrate may be any described above. In various embodiments, the substrate is coated or uncoated, treated or untreated, and combinations of these. In various embodiments, the substrate is chosen from plastic, metals such as steel, iron, and aluminum, and combinations thereof. In other embodiments, the substrate is unpolished cold rolled steel, aluminum, or galvanized steel. The automobile component may be a door, hood, roof, panel, etc., and the like. The automobile component may include steel and/or extruded materials. In one embodiment, the automotive component is further defined as an automotive body panel.

The coating may be disposed on and in direct contact with the substrate. In other embodiments, the substrate may include a basecoat layer disposed on the n-acyl urea coating and a topcoat layer disposed on the basecoat layer sandwiching said basecoat layer between the n-acyl urea coating and said topcoat layer. The coating may be disposed on and in direct contact with the substrate while the basecoat layer may be disposed on and in direct contact with the coating, while the topcoat layer may be disposed on and in direct contact with the basecoat layer. The basecoat layer and the topcoat layer may be any known in the art.

Method of Forming the Automobile Component:

This disclosure also provides a method of forming the automobile component. In various embodiments, the method includes the step of providing the pigmented primer composition, providing the substrate, and applying the pigmented primer composition on the substrate. The composition may be applied on or to the substrate via any method known in the art, including, but not limited to, brushing, spray coating, dip coating, roll coating, curtain coating, electrostatic spraying, and combinations thereof. The method may include the step of curing the composition to form the coating and/or of reacting the polycarbodiimide-polyurethane hybrid and the acid functional polymer in the presence of the organic solvent, the pigment, and the inorganic filler, to form the coating on the substrate. Alternatively, the polycarbodiimide-polyurethane hybrid may react with the acid functional polymer upon combination with no explicit independent step taken in the method.

The method may also include the step of drawing down the composition on the automobile component, of heating the automobile component, of applying radiation to the automobile component, of drying the automobile component, and/or of installing the automobile component including the coating on an automobile chassis.

EXAMPLES

A series of polycarbodiimide-polyurethane hybrids (Hybrids 1-14) are formed according to this disclosure as set forth in Table 1 below. These hybrids are formed by reacting toluene diisocyanate (i.e., a mixture of the 2,4- and 2,6-isomers of toluene diisocyanate in a weight ratio of 80% to 20%) and various polyols. Various hybrids are then analyzed to determine a residual amount of TDI monomer.

TABLE 1

| Hyb. | Iso Wt. % | Polyol 1 | Wt. % | Polyol 2 | Wt. % | TPP Wt. % | Inert 2 Wt. % | MPPO Wt. % | Total | Res. TDI Wt % |
|---|---|---|---|---|---|---|---|---|---|---|
| 1 | 48.08 | GP430 | 2.89 | 2-PH | 24.76 | 0.14 | 24.04 | 0.1 | 100.01 | 0.004 (40 ppm) |
| 2 | 47.93 | GP430 | 2.88 | 1-Dec | 24.99 | 0.14 | 23.96 | 0.1 | 100.00 | 0.016 (160 ppm) |
| 3 | 47.20 | GP430 | 2.83 | 2-PH | 26.14 | 0.14 | 23.60 | 0.1 | 100.01 | 0.006 (60 ppm) |
| 4 | 42.73 | GP430 | 2.56 | 2-PH | 33.14 | 0.13 | 21.36 | 0.08 | 100.00 | 0.009 (90 ppm) |
| 5 | 48.56 | GP730 | 2.91 | 2-PH | 24.28 | 0.15 | 26.01 | 0.1 | 102.01 | 0.007 (70 ppm) |
| 6 | 52.33 | Gly | 2.09 | 2-PH | 19.21 | 0.1 | 26.17 | 0.1 | 100.00 | — |
| 7 | 48.77 | P858 | 2.91 | 2-PH | 23.68 | 0.15 | 24.39 | 0.1 | 100.00 | — |
| 8 | 47.07 | GP730 | 5.65 | 2-PH | 23.52 | 0.09 | 23.53 | 0.14 | 100.00 | — |
| 9 | 51.00 | Gly | 1.53 | 2-PH | 21.72 | 0.15 | 25.50 | 0.1 | 100.00 | — |
| 10 | 50.94 | Gly | 1.53 | 2-PH | 21.81 | 0.15 | 25.47 | 0.1 | 100.00 | — |
| 11 | 47.98 | Gly | 1.44 | 2-PH | 26.35 | 0.14 | 23.99 | 0.1 | 100.00 | 0.004 (40 ppm) |
| 12 | 44.26 | Gly | 1.36 | 2-PH | 32.03 | 0.13 | 22.13 | 0.09 | 100.00 | 0.003 (30 ppm) |
| 13 | 50.87 | Gly | 1.53 | 2-PH | 22.72 | 0.14 | 24.64 | 0.1 | 100.00 | 0.004 (40 ppm) |
| 14 | 50.02 | Gly | 1.5 | 2-PH | 23.22 | 0.15 | 25.01 | 0.1 | 100.00 | 0.002 (20 ppm) |

In Table 1, the following are utilized:

The isocyanate for all of the Hybrids 1-14 is Lupranate T-80 which is commercially available from BASF Corporation.

TPP is triphenyl phosphite.

N-butyl acetate is used as Inert 2 for all except Hybrid 3 and 14. In Hybrid 3, propylene glycol monomethyl ether acetate is used as Inert 2. In Hybrid 14, t-butyl acetate is used as Inert 2.

The catalyst for all of the Examples 1-14 is MPPO which is 3-Methyl-1-phenyl-2-phospholene 1-oxide.

GP430 is Pluracol GP-430 polyol that is commercially available from BASF Corporation.

P858 is Pluracol 858 that is commercially available from BASF Corporation.

GP730 is Pluracol GP730 that is commercially available from BASF Corporation.

Gly is glycerine.

2-PH is 2-propyl heptanol.

1-Dec is 1-decanol.

Res. TDI indicates a residual amount of TDI monomer in weight percent (and parenthetically in "ppm") as determined using DIN EN ISO 10283.

A series of acid functional polymers (Polymers A-AA) are formed as described in Table 2 below.

DMPA is dimethylol propionic acid.

HPE is Laroflex HS9000 that is commercially available from BASF Corporation.

TPG is tripropylene glycol.

GP730 is Pluracol GP730 that is commercially available from BASF Corporation.

410 is Pluracol P410 that is commercially available from BASF Corporation.

2010 is Pluracol P2010 that is commercially available from BASF Corporation.

1010 is Pluracol P1010 that is commercially available from BASF Corporation.

710 is Pluracol P710 that is commercially available from BASF Corporation.

Gly is glycerine.

2090 is Pluracol 2090 that is commercially available from BASF Corporation.

BA is n-butyl acetate.

Diox. is 1,4-dioxane.

Three additional polycarbodiimide-polyurethane hybrids (Hybrids 15-17) are also formed. These hybrids are formed by reacting toluene diisocyanate (i.e., a mixture of the 2,4- and 2,6-isomers of toluene diisocyanate in a weight ratio of 80% to 20%) and various polyols, as described below.

Hybrid 15:

500 g toluene diisocyanate (TDI), 1.5 g triphenylphosphite (TPP) and 1 g of 5% solution of 3-methyl-1-phenyl-

TABLE 2

| Poly | Iso. | Wt. % | Polyol 1 | Wt. % | Polyol 2 | Wt % | Polyol 3 | Wt % | Inert 1/ Wt % | Total |
|---|---|---|---|---|---|---|---|---|---|---|
| A | MI | 18.40 | DMPA | 4.93 | TPG | 6.69 | — | — | Diox/69.98 | 100.00 |
| B | MI | 16.63 | DMPA | 3.17 | 410 | 8.20 | — | — | Diox/72 | 100.00 |
| C | 5020 | 46.48 | DMPA | 3.52 | — | — | — | — | Diox/50 | 100.00 |
| D | T80 | 22.37 | DMPA | 8.63 | — | — | — | — | Diox/69 | 100.00 |
| E | T80 | 10.16 | DMPA | 15.67 | — | — | — | — | Diox/74.17 | 100.00 |
| F | T80 | 12.20 | DMPA | 18.8 | — | — | — | — | MEK/69 | 100.00 |
| G | M | 23.90 | DMPA | 6.4 | — | — | — | — | Diox/69.7 | 100.00 |
| H | MI | 24.45 | DMPA | 6.55 | — | — | — | — | Diox/69 | 100.00 |
| I | T80 | 16.87 | DMPA | 6.52 | GP730 | 24.57 | — | — | Diox/52.05 | 100.00 |
| J | T80 | 17.68 | DMPA | 6.82 | GP730 | 20.98 | — | — | Diox/54.52 | 100.00 |
| K | T80 | 12.41 | DMPA | 4.76 | GP730 | 9.14 | 710 | 9.14 | Diox/64.56 | 100.00 |
| L | T80 | 12.96 | DMPA | 4.97 | GP730 | 7.31 | 410 | 7.31 | Diox/67.45 | 100.00 |
| M | T6040 | 19.44 | DMPA | 8.68 | — | — | — | — | Diox/71.88 | 100.00 |
| N | 5020 | 25.99 | DMPA | 2.01 | — | — | — | — | Diox/72 | 100.00 |
| O | 5070 | 25.35 | DMPA | 2.65 | — | — | — | — | Diox/72 | 100.00 |
| P | MP102 | 23.69 | DMPA | 4.31 | — | — | — | — | Diox/72 | 100.00 |
| Q | T80 | 14.88 | DMPA | 5.7 | TPG | 7.42 | — | — | Diox/72 | 100.00 |
| R | T80 | 28.31 | DMPA | 6.04 | 410 | 15.65 | — | — | Diox/50 | 100.00 |
| S | T80 | 31.09 | DMPA | 11.97 | 410 | 3.47 | Gly | 3.47 | Diox/50 | 100.00 |
| T | T80 | 19.14 | DMPA | 3.00 | 410 | 27.86 | — | — | Diox/50 | 100.00 |
| U | T80 | 18.38 | DMPA | 5.00 | 410 | 26.62 | — | — | Diox/50 | 100.00 |
| V | T80 | 17.10 | DMPA | 3.00 | 410 | 29.90 | — | — | 50 | 100.00 |
| W | T80 | 5.76 | DMPA | 1.48 | 2010 | 21.38 | 2090 | 21.38 | Diox/50 | 100.00 |
| X | T80 | 10.04 | DMPA | 4.00 | 1010 | 17.98 | 2090 | 17.98 | Diox/50 | 100.00 |
| Y | T80 | 15.29 | HPE | 62.41 | — | — | — | — | BA/22.30 | 100.00 |
| Z | T80 | 9.50 | HPE | 38.77 | — | — | — | — | BA/51.73 | 100.00 |
| AA | MI | 17.33 | HPE | 24.52 | — | — | — | — | BA/58.15 | 100.00 |

In Table 2, the following are utilized:

T-80 is Lupranate T-80 that is commercially available from BASF Corporation.

MI is Lupranate MI that is commercially available from BASF Corporation.

5020 is Lupranate 5020 that is commercially available from BASF Corporation.

T6040 is commercially available from Degussa and is a mixture of IPDI and its trimer.

5070 is Lupranate 5070 that is commercially available from BASF Corporation.

MP102 is Lupranate MP102 that is commercially available from BASF Corporation.

2-phospholene 1-oxide (MPPO) catalyst in toluene are placed into a glass reactor equipped with heating mantle, stirrer, thermometer, condenser and inert gas sparge. The mixture is heated to 80° C. for 260 minutes and then cooled. To the resulting mixture is added n-butyl acetate and stirred. The solution is heated to 60° C. and to which a homogeneous mixture of trimethylolpropane (TMP)/2-ethylhexanol is added slowly. The resulting mixture is reacted at 90° C. until the NCO band at 2250 cm-1 is not detectable by FT-IR. The resulting mixture is ~75% solids with a % NCN of 6.7. Without intending to be bound by any particular theory, it is believed that Hybrid 15 has the following structure:

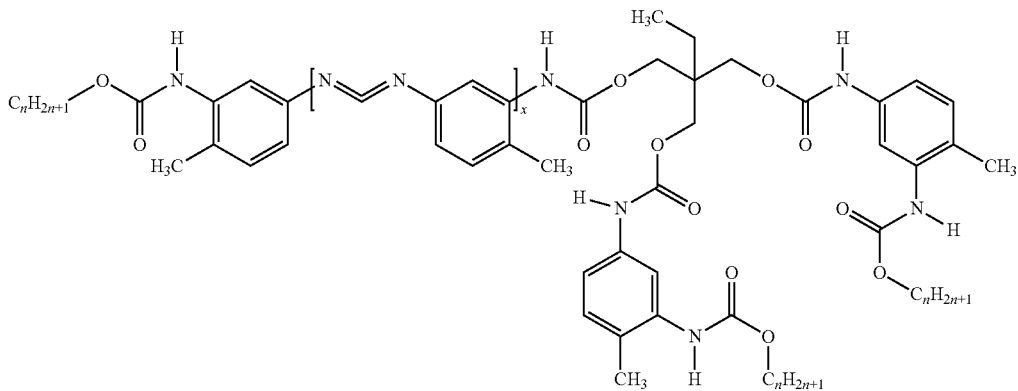

wherein the $C_nH_{2n+1}$ moiety is a 2-ethyl-1-hexanol moiety and x is approximately from 1 to 150 (e.g. a Mw of 130-6500 g/mol).

Hybrid 16:

500 g toluene diisocyanate (TDI), 1.5 g triphenylphosphite (TPP) and 2 g of 5% solution of 3-methyl-1-phenyl-2-phospholene 1-oxide (MPPO) catalyst in toluene are placed into a glass reactor equipped with heating mantle, stirrer, thermometer, condenser and inert gas sparge. The mixture is heated to 80° C. for 90 minutes and then cooled. To the resulting mixture is added n-butyl acetate and stirred. The solution is heated to 60° C. and to which a homogeneous mixture of trimethylolpropane (TMP)/2-ethylhexanol/1-propanol is added slowly. The resulting mixture is reacted at 80° C. until the NCO band at 2250 cm-1 is not detectable by FT-IR. The resulting mixture is ~75% solids with a % NCN of 5.8.

Hybrid 17:

500 g toluene diisocyanate (TDI), 1.5 g triphenylphosphite (TPP) and 2 g of 5% solution of 3-methyl-1-phenyl-2-phospholene 1-oxide (MPPO) catalyst in toluene are placed into a glass reactor equipped with heating mantle, stirrer, thermometer, condenser and inert gas sparge. The mixture is heated to 80° C. for 90 minutes and then cooled. To the resulting mixture is added n-butyl acetate and stirred. The solution is heated to 60° C. and to which a homogeneous mixture of trimethylolpropane (TMP)/1-propanol is added slowly. The resulting mixture is reacted at 80° C. until the NCO band at 2250 cm-1 is not detectable by FT-IR. The resulting mixture is ~75% solids with % NCN of 6.7.

Formation of Pigmented Primer Compositions 1-4 and Comparative Composition 5:

After formation of the aforementioned Hybrids, Hybrid 15 is utilized to form Pigmented Primer Compositions 1-4 below, as set forth in Table 3 below. Moreover, a Comparative Composition 5 is utilized but does not include any of the aforementioned hybrid or acid functional polymer. The Pigmented Primer Compositions 1-4 and the Comparative Composition 5 are coated on various substrates as primer coats. Those substrates are subsequently coated with PPG Deltron 2000 basecoat and Glasurit 932-550 clearcoat to form a series of articles. The Compositions are applied onto a substrate, aged over night at room temperature, sanded with 500 grit sandpaper, cleaned off with a suitable cleaning solvent, base coated by spraying two coast of the Deltron 2000 basecoat followed by two coats of 932-550 clear coat. The articles are then evaluated to determine various physical properties, as also set forth in Table 3 below. All values in Table 3 are in parts by weight unless otherwise indicated.

TABLE 3

| Composition | #1 | #2 | #3 | #4 | #5 |
|---|---|---|---|---|---|
| Acid Functional Polymer | 50 | 50 | 33 | 33 | N/A |
| Butyl Acetate 1 | 60 | 60 | 60 | 60 | N/A |
| Butyl Acetate 2 | 86 | 86 | 80 | 80 | N/A |
| Bentonite Clay | 1.5 | 1.5 | 3 | 3 | N/A |
| Titanium Dioxide | 34 | 34 | 34 | 34 | N/A |
| Barium Sulfate | 68 | 68 | 68 | 68 | N/A |
| Calcium Carbonate | 68 | 68 | 68 | 68 | N/A |
| Talc | 34 | 34 | 34 | 34 | N/A |
| Total | 401.5 | 401.5 | 380 | 380 | N/A |
| Polycarbodiimide-Polyurethane Hybrid 15 | 71 | 71 | 46 | 46 | N/A |
| Butyl Acetate 3 | 38 | 38 | 23 | 23 | N/A |
| Ratio Of NCN:OH Groups | 0.75:1 | 1:1 | 0.75:1 | 1:1 | N/A |
| Percent Total Solids | 60 | 60 | 60 | 60 | 60 |
| Pigment Volume Concentration | 39% | 39% | 50% | 50% | — |
| Anti-Corrosion (Salt Spray) 590 hrs ASTM B117; ASTM D-1654-08 | | | | | |
| Unpolished Cold Rolled Steel | 3 | 3 | 2 | 5 | 2 |
| Galvanized steel ACT #59453 HDG 60 GR | 4 | 5 | 4 | 4 | 4 |
| Aluminum ACT #19081 | 9 | 9 | 9 | 9 | 6 |
| Humidity Resistance 120 hrs | | | | | |

TABLE 3-continued

| Composition | #1 | #2 | #3 | #4 | #5 |
|---|---|---|---|---|---|
| ASTM D2247 | | | | | |
| Unpolished Cold Rolled Steel | 10 | 10 | 10 | 10 | 10 |
| Galvanized steel ACT #59453 HDG 60 GR | 10 | 10 | 10 | 10 | 10 |
| Aluminum ACT #19081 | 10 | 10 | 10 | 10 | 10 |
| Water Immersion 120 hrs ASTM D-714-02 | | | | | |
| Unpolished Cold Rolled Steel | 10 | 10 | 10 | 10 | 10 |
| Galvanized steel ACT #59453 HDG 60 GR | 10 | 10 | 10 | 10 | 10 |
| Aluminum ACT #19081 | 10 | 10 | 10 | 10 | 10 |
| Adhesion –7 day dry ASTM D3359 Method B | | | | | |
| Unpolished Cold Rolled Steel | 4B | 5B | 3B | 4B | 4B |
| Galvanized steel ACT #59453 HDG 60 GR | 4B | 5B | 2B | 4B | 0B |
| Aluminum ACT #19081 | 3B | 4B | 3B | 4B | 4B |
| QUV 360 hrs % gloss retention (20°) ASTM D4587 (UVA 340 bulbs, 8/4 cycle) | | | | | |
| Unpolished Cold Rolled Steel | 100 | 100 | 99 | 100 | 100 |
| dE (color change) | 1.11 | 1.07 | 1.32 | 1.22 | 0.76 |

The Acid Functional Polymer is Empol 1043 which is a trimer acid that is commercially available from BASF Corporation.

Butyl Acetate 1, 2, and 3 is butyl acetate solvent added at different points during formation and is representative of an organic solvent.

Bentonite Clay is Bentone SD-2 that is commercially available from Elementis Specialties and is representative of a inorganic filler.

Titanium Dioxide is Ti-Pure® R-900 that is commercially available from DuPont and is representative of a pigment.

Barium Sulfate is commercially available from Cimbar Performance Minerals and is representative of a inorganic filler.

Calcium Carbonate is M3 Calcium Carbonate commercially available from Great Lakes Calcium and is representative of a inorganic filler.

Talc is JF-500 that is commercially available from Luzenac and is representative of a inorganic filler.

The polycarbodiimide-polyurethane hybrid is Hybrid 15 is as described above.

The ratio of NCN:OH groups is the stoichiometric ratio of NCN groups in Hybrid 15 to the OH groups in the Acid Functional Polymer.

The Percent Total Solids is the weight percent of solids minus any solvents.

The Pigment Volume Concentration is calculated as [[the volume of solid material (e.g. pigment and inorganic filler)] divided by [the Percent Total Solids]]×100.

Composition 5 is a comparative composition that is commercially available from BASF under the trade name R-M DP 236 direct to metal primer.

dE color change (also known as delta e) is determined using the Cie76 algorithm. More specifically, the calculation is as follows: $\Delta E^*_{ab} = \sqrt{(L^*_2 L^*_1)^2 + (a^*_2 - a^*_1)^2 + (b^*_2 - b^*_1)^2}$.

This data shows that the N-acyl urea coating of this disclosure is formed from the crosslinking of a polycarbodiimide-polyurethane hybrid polymer and an acid functional polymer and provides excellent corrosion resistance.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A pigmented primer composition for forming an n-acyl urea coating that resists corrosion, said composition comprising:
    a polycarbodiimide-polyurethane hybrid having the structure:

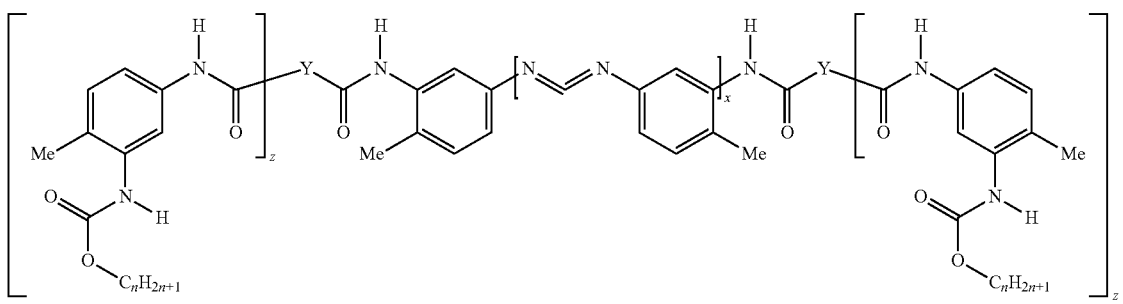

wherein:
    each n is independently a number from 1 to 20;
    each Y is independently an alkoxy or polyalkoxy group having (w) oxygen atoms, wherein each w is independently at least 1;
    each z is independently a number from 0 to (w-1); and
    x, Y, and a total of said $C_nH_{2n+1}$ groups are present in a ratio of from (4 to 5):(0.5 to 1.5):(2.5 to 4.5), respectively an acid functional polymer;
an organic solvent;
a pigment; and
an inorganic filler;
wherein:
    said composition comprises less than or equal to 10 weight percent of water based on a total weight of said composition;
    said composition includes less than about 100 parts by weight of toluene diisocyanate per one million parts by weight of said composition; and
    said n-acyl urea coating exhibits corrosion resistance of 2 to 10 as determined using ASTM B117 and ASTM D-1654-08 on a substrate that is unpolished cold rolled steel, aluminum, or galvanized steel.

2. The pigmented primer composition of claim 1 wherein:
    said n-acyl urea coating exhibits adhesion of 3 to 5 as determined using ASTM D3359 Method B on a substrate that is unpolished cold rolled steel, aluminum, or galvanized steel; and/or
    said n-acyl urea coating exhibits humidity resistance of 5 to 10 as determined using ASTM D2247 on a substrate that is unpolished cold rolled steel, aluminum, or galvanized steel; and/or
    said n-acyl urea coating exhibits blistering resistance of 5 to 10 as determined using water immersion and ASTM D-714-02 on a substrate that is unpolished cold rolled steel, aluminum, or galvanized steel.

3. The pigmented primer composition of claim 1 wherein said pigment is titanium dioxide.

4. The pigmented primer composition of claim 1 wherein each Y is independently derived from a tri-hydroxy functional polyol having a hydroxyl number from 1500 to 2000 mg KOH/g.

5. The pigmented primer composition of claim 1 wherein each Y is independently derived from a tri-hydroxy functional polyol having a hydroxyl number from 800 to 1200 mg KOH/g.

6. The pigmented primer composition of claim 1 wherein each Y is independently derived from a tri-hydroxy functional polyol having a hydroxyl number from 20 to 400 mg KOH/g.

7. The pigmented primer composition of claim 1 wherein each Y is derived from glycerine.

8. The pigmented primer composition of claim 1 wherein each Y is independently derived from a diol chosen from propylene glycol, ethylene glycol, copolymers thereof, and combinations thereof.

9. The pigmented primer composition of claim 1 wherein each Y is independently derived from a monol chosen from 1-decanol, 2-propyl-1-heptanol, 2-ethyl-hexanol, and combinations thereof.

10. The pigmented primer composition of claim 1 wherein:
    each w is 3 and each z is 2, or
    each w is 2 and each z is 1.

11. The pigmented primer composition of claim 1 wherein each n is independently from 1 to 20.

12. The pigmented primer composition of claim 1 wherein x, Y, and a total of said $C_nH_{2n+1}$ groups are present in a ratio of from (4.5 to 5):(0.95 to 1.05):(3.3 to 3.7), respectively.

13. The pigmented primer composition of claim 1 wherein said acid functional polymer has the formula $HO(O)CR[C(O)OH]_m$ wherein R is an alkyl group having from 1 to 36 carbon atoms and m is from 0 to 3.

14. The pigmented primer composition of claim 13 wherein said acid functional polymer is a polymer of a dimer acid.

15. The pigmented primer composition of claim 1 wherein said acid functional polymer is further defined as a polyacrylic acid.

16. The pigmented primer composition of claim 1 wherein said acid functional polymer is further defined as an acid functional polyurethane.

17. The pigmented primer composition of claim 16 wherein said acid functional polyurethane has the formula:

OCNR'NHCOOCH$_2$C(CH$_3$)(COOH)CH$_2$OCONHR'NCO, wherein:
- each R' is independently a TDI, MDI, HDI, IPDI, NDI, or TMXDI residue, or
- said acid functional polyurethane is a prepolymer of TDI, MDI, HDI, IPDI, NDI, or TMXDI.

18. The pigmented primer composition of claim 1 wherein said acid functional polymer is further defined as an acid functional polyester that is chosen from (1) a polymer of styrene, maleic anhydride, and an alcohol, (2) a polymer of caprolactone and dimethylolpropionic acid, and combinations thereof.

19. A method of forming the pigmented primer composition of claim 1, the method comprising:
- combining the polycarbodiimide-polyurethane hybrid, the acid functional polymer, the organic solvent, the pigment, and the inorganic filler to form the pigmented primer composition.

20. An n-acyl urea coating formed from the pigmented primer composition of claim 1 comprising the reaction product of the polycarbodiimide-polyurethane hybrid and the acid functional polymer, wherein said n-acyl urea coating exhibits corrosion resistance of 2 to 10 as determined using ASTM B117 and ASTM D-1654-08 when disposed on a substrate that is unpolished cold rolled steel, aluminum, or galvanized steel.

\* \* \* \* \*